United States Patent
Lemke et al.

(10) Patent No.: US 6,845,408 B1
(45) Date of Patent: Jan. 18, 2005

(54) METHOD FOR CONTROLLING SOFTWARE IN AN ELECTRONIC SYSTEM HAVING AN INSERTABLE PERIPHERAL DEVICE

(75) Inventors: Steven Lemke, Sunnyvale, CA (US); Lee R. Taylor, Fremont, CA (US)

(73) Assignee: palmOne, Inc., Milpitas, CA (US)

( * ) Notice: Subject to any disclaimer, the term of this patent is extended or adjusted under 35 U.S.C. 154(b) by 22 days.

(21) Appl. No.: 10/155,432

(22) Filed: May 23, 2002

(51) Int. Cl.$^7$ .............................................. G06F 3/00
(52) U.S. Cl. .............................. 710/18; 710/8; 710/14; 710/17
(58) Field of Search ............................... 710/8, 14, 15, 710/16, 17, 18, 19, 36, 37, 38, 40

(56) References Cited

U.S. PATENT DOCUMENTS

| | | | | |
|---|---|---|---|---|
| 5,939,656 A | * | 8/1999 | Suda ........................... | 84/630 |
| 6,353,870 B1 | * | 3/2002 | Mills et al. ................. | 710/301 |
| 2001/0049995 A1 | * | 12/2001 | Torii et al. ................... | 84/718 |
| 2002/0018027 A1 | * | 2/2002 | Sugimoto ...................... | 345/1 |

OTHER PUBLICATIONS

Derwent–Acc–No: 2001–474236, Inventor: Park, S U, Priority Data: 1999KR–0030391.*

* cited by examiner

*Primary Examiner*—Jeffrey Gaffin
*Assistant Examiner*—Alan Chen
(74) *Attorney, Agent, or Firm*—Wagner, Murabito, & Hao LLP

(57) ABSTRACT

An embodiment of the present invention is directed to a method for controlling software in an electronic system having a plurality of applications and an insertable peripheral device. In one embodiment of the present invention, an indication is received from a headphone jack regarding the insertion state of an audio plug. In response to the indication, a software application resident on said electronic system is automatically notified of the insertion state. In response to the notifying, the execution state of the software application is automatically changed. In one example, the application suspends when the plug is removed and automatically resumes when the plug is reinserted.

29 Claims, 4 Drawing Sheets

METHOD FOR CONTROLLING SOFTWARE IN AN ELECTRONIC SYSTEM HAVING AN INSERTABLE PERIPHERAL DEVICE

FIELD OF THE INVENTION

The present invention relates to the field of portable electronic devices. More specifically, embodiments of the present invention are directed to a method for controlling a software application on a handheld computer system.

BACKGROUND OF THE INVENTION

Advances in computer technology have enabled the further miniaturization of the components required to build computer systems. As such, new categories of computer systems have been created. One of the newer categories of computer systems is the portable or handheld computer system, also referred to as a personal digital assistant or PDA. Other examples of a portable computer system include electronic address books, electronic day planners, electronic schedulers, mini-browsers, cell phones, etc.

A handheld computer system is a computer that is small enough to be held in the user's hand and, as a result, handhelds are readily carried about in the user's briefcase, purse, and in some instances, in the user's pocket. By virtue of its size, the handheld computer, being inherently lightweight, is therefore exceptionally portable and convenient.

In order to exploit the growing popularity of handheld computer systems, new hardware and software based features and new peripheral devices are constantly being developed for portable systems. For example, handheld computer systems can be configured to function as digital cameras, wireless telephones, Global Positioning System (GPS) devices, etc. Additionally, greater functionality is possible now with handheld computer systems as more software applications are developed which provide users with greater functionality.

One current technology trend facilitates using handheld computer systems to play recorded music for users. One popular implementation of this technology is the MP3 player. MP3 is an audio encoding standard developed under the sponsorship of the Moving Picture Experts Group (MPEG). A digital audio compression algorithm compresses audio files by an order of magnitude while preserving sound quality. MP3 files can be downloaded from many Internet sites and played using software available for most operating systems. Because of the popularity and compact size of MP3 devices, manufacturers of portable computer systems are integrating MP3 players into their computer systems.

However, navigating traditional menu hierarchies utilized on handheld computer systems may prove bothersome for some users compared to the simplified user interfaces used on dedicated MP3 devices. For example, a user of a handheld computer system manually turns the device on. Then, the user navigates a plurality of hierarchical menus in order to reach an application launcher and only then is the music player started. Navigating the menus may be accomplished using mechanical buttons or a touch screen on the device. Because of the greater number of steps involved in navigating to and starting the music player, some users find handheld computer systems somewhat inconvenient compared to dedicated MP3 players.

SUMMARY OF THE INVENTION

The present invention is a method for controlling software in an electronic system having a plurality of applications and adapted to receive an insertable peripheral device. In one embodiment of the present invention, an indication is received from a headphone jack regarding the insertion state of an audio plug. In response to the indication, a software application resident on said electronic system is automatically notified of the insertion state. In response to the notifying, the execution state of the software application is automatically changed. In one example, a software application may automatically pause and resume execution of a task based on the insertion state of the audio plug.

Embodiments of the present invention provide a fast, robust method for controlling software (e.g., audio applications) on a handheld computer system. In one embodiment of the present invention, a user inserts an audio plug into a headphone jack of a handheld computer system. An audio software application resident on the handheld computer system is automatically initiated or resumed in response to inserting the audio plug. Thus, in accordance with embodiments of the present invention, initiating audio applications on the handheld computer system is simplified because a user can automatically initiate audio applications resident on the handheld computer system by inserting the audio plug and without having to navigate a plurality of menus. Additionally, the user can automatically terminate or pause the audio application by removing the audio plug from the headphone jack.

According to embodiments of the present invention, the user can also select an audio application by inserting the audio plug into the headphone jack. In this embodiment, the handheld computer system will halt a first application which is currently running and initiate the audio application, making it the active application. In one embodiment, when the audio plug is removed from the headphone jack, the audio application is automatically terminated or suspended and the first application is again made the active application.

In one embodiment, the present invention allows a telephone call to be answered by automatically inserting the audio plug into the headphone jack. Once the audio plug is removed, the handheld computer system automatically terminates the phone application and resumes any application that was suspended when the call was answered.

These and other advantages of the present invention will become obvious to those of ordinary skill in the art after having read the following detailed description of the preferred embodiments which are illustrated in the various drawing figures.

BRIEF DESCRIPTION OF THE DRAWINGS

The accompanying drawings, which are incorporated in and form a part of this specification, illustrate embodiments of the present invention and, together with the description, serve to explain the principles of the invention.

DETAILED DESCRIPTION OF THE PREFERRED EMBODIMENT

Reference will now be made in detail to the preferred embodiments of the present invention, examples of which are illustrated in the accompanying drawings. While the present invention will be described in conjunction with the preferred embodiments, it will be understood that they are not intended to limit the present invention to these embodiments alone. On the contrary, the present invention is intended to cover alternatives, modifications, and equivalents which may be included within the spirit and scope of the present invention as defined by the appended claims. Furthermore, in the following detailed description of the present invention, numerous specific details are set forth in order to provide a thorough understanding of the present invention. However, the present invention may be practiced without these specific details. In other instances, procedures, components, and circuits have not been described in detail so as not to unnecessarily obscure aspects of the present invention.

Figure 1:
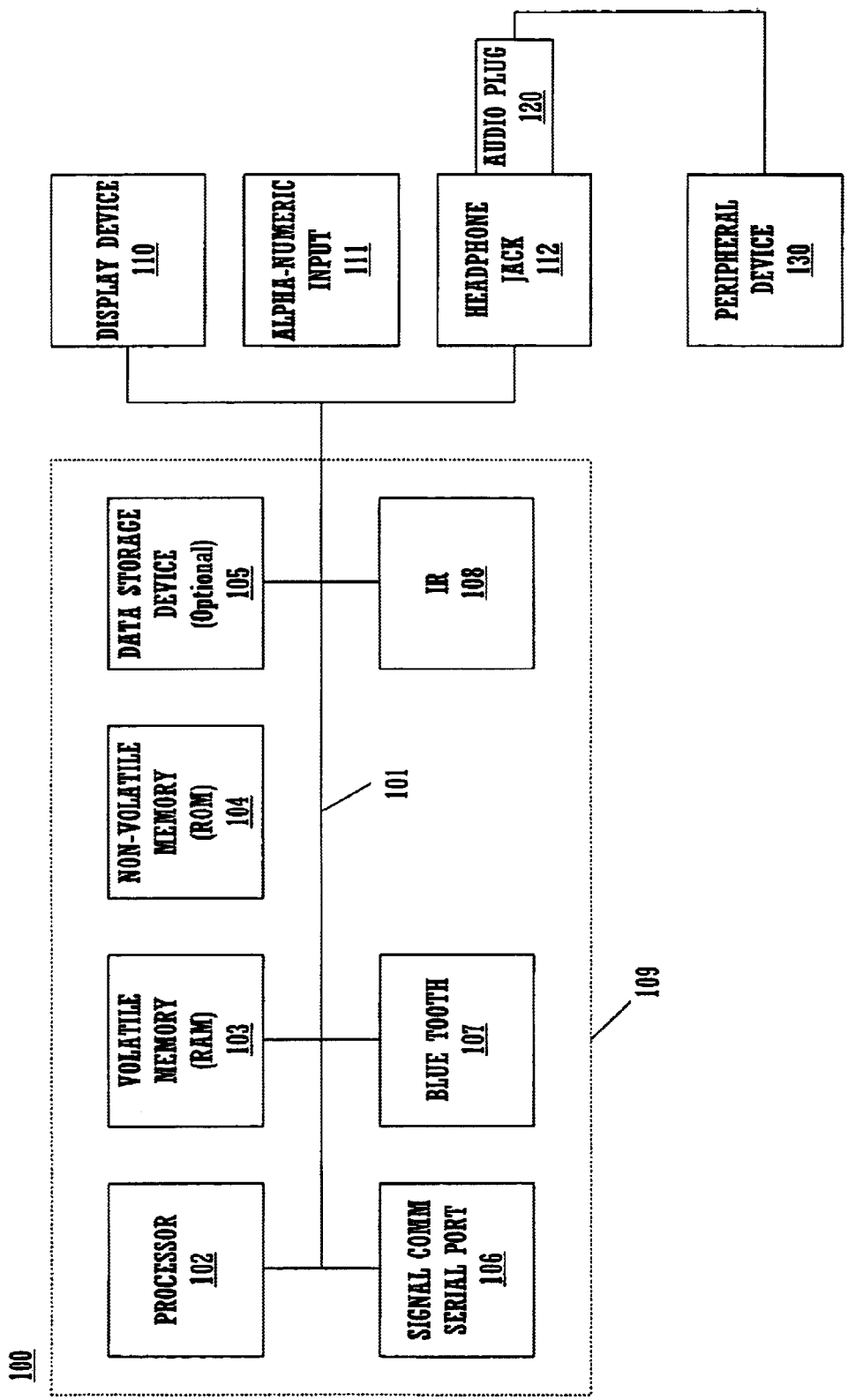
FIG. 1 is a block diagram of an exemplary handheld computer system upon which embodiments of the present invention may be utilized.

FIG. 1 illustrates an exemplary circuitry of portable handheld computer system 100 upon which embodiments of the present invention may be implemented. Handheld computer system 100 includes an address/data bus 101 for communicating information, a central processor 102 coupled with the bus 101 for processing information and instructions, a volatile memory 103 (e.g., random access memory RAM) coupled with the bus 101 for storing information and instructions for the central processor 102 and a non-volatile memory 104 (e.g., read only memory ROM) coupled with the bus 101 for storing static information and instructions for the processor 102. Handheld computer system 100 also includes an optional data storage device 105 (e.g., thin profile removable memory) coupled with the bus 101 for storing information and instructions.

As described above, system 100 also contains a signal communication device 106, also coupled to bus 101. Signal communication device 106 can be a serial port (or USB port) for communicating with a cradle (not shown). In addition to device 106, wireless communication links can be established between the device 100 and a host computer system (or another portable computer system) using a Bluetooth wireless device 107 or an infrared device 108. These devices are housed on a circuit board 109 which is contained within a cover assembly.

Also included in handheld computer system 100 is a display device 110. Display device 110 may be a liquid crystal display, field emission device (FED, also called flat panel CRT), organic light emitting diode (OLED), E-ink, or any other display device suitable for creating graphic images and alphanumeric characters recognizable to the user. In one embodiment, the display 110 is a flat panel multi-mode display capable of both monochrome and color display modes.

Handheld computer system 100 may include an alphanumeric input device 111 coupled with bus 101. In the present invention, the input device 111 may include a flat panel resistive touch screen display as described above. Input device 111 can communicate information (spatial data) and command selections to the central processor 102. Input device 111 is capable of registering a position on the screen 110 where contact is made.

Additionally, handheld computer system 100 includes a headphone jack 112, which can conduct audio signals from central processor 102 to an audio plug 120 which is inserted therein. Audio plug 120 is coupled to a peripheral device 130. Peripheral device 130 can be a variety of audio devices such as a headphone device, a set of audio speakers, or a telephone headset.

Additionally, headphone jack 112 can act as a peripheral input for peripheral device 130 to facilitate two-way communication between processor 102 and peripheral device 130. For example, if peripheral device 130 is a telephone headset, audio signals from headset 130 can be conducted to processor 102 via headphone jack 112.

Figure 2A:
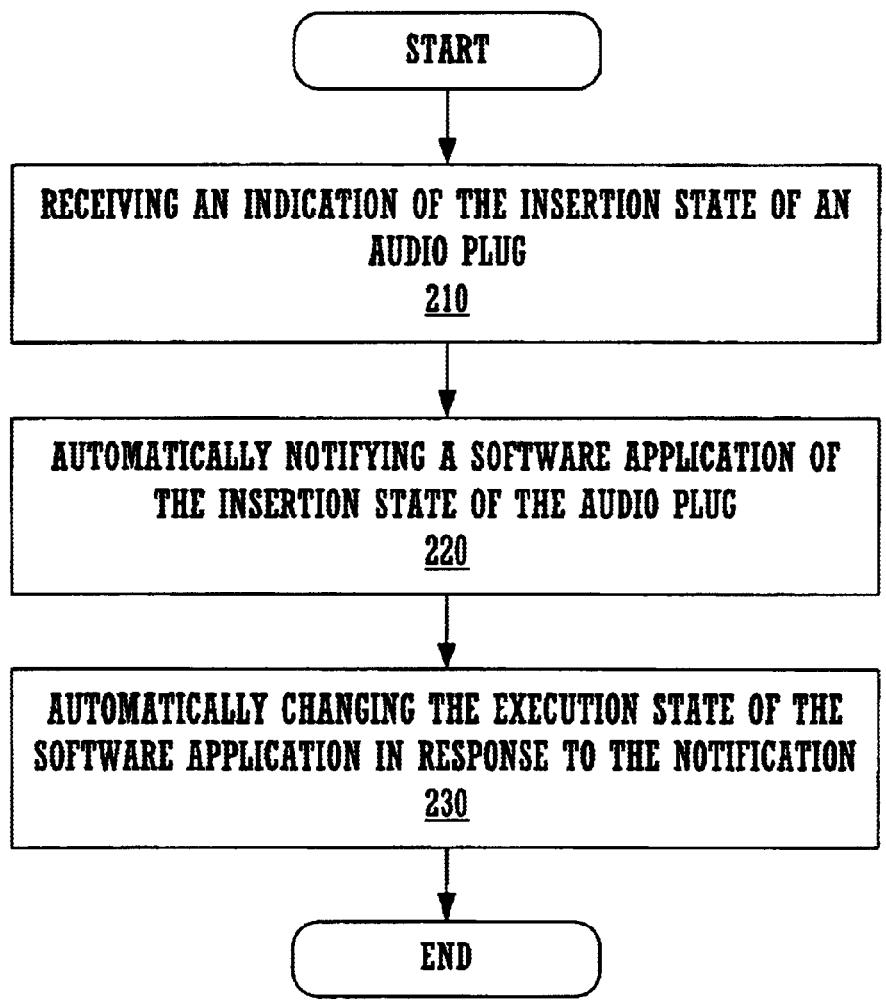
FIGS. 2A and 2B are flow charts of a method for controlling software in accordance with embodiments of the present invention.

FIG. 2A is a flow chart of a computerized method 200 for controlling software on an electronic system in accordance with embodiments of the present invention. While the present invention can be used on a variety of electronic devices, for clarity the following descriptions will refer to handheld computer system 100 of FIG. 1. In step 210, an indication is received from a headphone jack (e.g., headphone jack 112 of FIG. 1) of the insertion state of an audio plug (e.g., audio plug 120 of FIG. 1). As mentioned above, audio plug 120 can be from a variety of peripheral devices such as headphone, audio speakers, or telephone headsets. In one implementation of the present invention, the indication is received when audio plug 120 is inserted into headphone jack 112. In another implementation of the present invention, the indication is received when audio plug 120 is removed from headphone jack 112.

In accordance with one embodiment of the present invention, the receiving of the indication is implemented by receiving a hardware interrupt from the headphone jack. Referring to FIG. 1, when an audio plug 120 is inserted or removed from headphone jack 112, a hardware interrupt is sent by an electronic circuit coupled with headphone jack 112 to processor 102. However, there are a variety of methods for receiving a hardware interrupt from headphone jack 112 which can be utilized in embodiments of the present invention. For example, in one embodiment, the hardware interrupt is first directed to an interrupt controller which prioritizes the hardware interrupts before sending them to the processor In one embodiment of the present invention, the indication may be received from a mechanical switch coupled with headphone jack 112 which is triggered when audio plug 120 is inserted or removed from headphone jack 112. In this embodiment, audio plug 120 will physically displace a portion of the mechanical switch and triggers sending a hardware interrupt to processor 102. In another embodiment of the present invention, the insertion state of audio plug 120 may be received from an electrical switch coupled with headphone jack 112. For example, if audio plug 120 is inserted into headphone jack 112, an electrical circuit is completed which will trigger the sending of a hardware interrupt from headphone jack 112. When audio plug 120 is removed, the circuit is broken and a different hardware interrupt is received from headphone jack 112.

In another embodiment of the present invention, receiving the indication of the insertion state comprises software polling the insertion state of the headphone jack. Software polling comprises software instructions which periodically instruct processor 102 to poll a hardware device of handheld computer system 100 to determine its state. In one embodiment of the present invention, a provision can be made in the operating system of handheld computer system 100 for software polling of headphone jack 112 to determine the audio plug insertion state.

Referring to step 220 of FIG. 2A, a software application is automatically notified of the insertion state of the audio plug. In accordance with embodiments of the present invention, an application resident on an electronic system (e.g., handheld computer system 100 of FIG. 1) is automatically notified of the indication of step 210. As mentioned above in step 210, in one embodiment the indication is generated in response to a user inserting or removing audio plug. 120 from headphone jack 112.

In one embodiment of the present invention, a user identifies a designated audio software application which is automatically notified of the insertion state of audio plug 120. However, while the present embodiment recites notifying a designated audio software application, the present invention is well suited for automatically notifying a variety of software applications such as games, audio software applications, wireless voice mail applications, wireless telephone applications, etc. This enables a user to control which audio software application will be notified when audio plug 120 is inserted or removed from headphone jack 112.

For example, in one embodiment a user may configure handheld computer system 100 to operate as an MP3 player.

Thus, when audio plug 120 is inserted into headphone jack 112, the designated MP3 audio player application is automatically notified. While the present embodiment recites an MP3 application specifically, the present invention is well suited for a variety of audio software applications operable on handheld computer system 100. For example, in one embodiment, a user can configure the present invention to automatically notify a wireless audio voicemail application in response to the indication of step 210. In another embodiment of the present invention, a user can configure the present invention to automatically notify a wireless telephone application in response to the indication of step 210.

In one embodiment of the present invention, in response to receiving the notification of step 220, the audio state of a software application active upon handheld computer system 100 is changed. For example, if a user is playing a movie upon system 100 which has a low-fidelity monophonic internal speaker system. The software application resident upon system 100 may send a low-fidelity monophonic audio signal to the internal speaker system in an attempt to conserve resources such as battery life. Upon receiving the indication of the insertion of audio plug 120, the software application sends a high-fidelity stereophonic audio signal to audio plug 120.

In one embodiment, the fidelity changing operation is handled in the operating system of handheld computer system 100. For example, the operating system may be equipped with a "sound managers" that mixes audio inputs from various sources, mixes the sources, and adjusts them for the output. The sound manager may output a low-fidelity (e.g., a 8 kHz monophonic) signal to the internal speaker in order to conserve battery life and to simplify mixing the audio signal. Upon receiving the indication of the insertion of audio plug 120, the operating system sound manager now outputs a high-fidelity (e.g., 44 kHz stereophonic) signal to audio plug 120. Additionally, in one embodiment, upon receiving indication of the insertion of audio plug 120, the audio signal to the internal speaker may be automatically interrupted in response to receiving the indication of the insertion of audio plug 120. In one embodiment, the audio signal to the internal speaker may be interrupted via a mechanical connection that is severed upon the insertion of audio plug 120. In another embodiment, the audio signal to the internal speaker may be interrupted by software resident upon handheld computer system 100 (e.g., an operation system sound manager) in response to receiving the indication of the insertion of audio plug 120.

In another embodiment of the present invention, if no application has been identified by the user as the designated application, a default audio application can be notified. For example, an MP3 application can be automatically notified by default when no other application has been identified by the user as the designated application.

Additionally, in one embodiment, the user may be automatically reminded to designate an audio application which will be notified of the insertion state of headphone jack 112. For example, if a user initiates an MP3 player five consecutive times by inserting audio plug 120 into headphone jack 112, the present invention will ask the user if they want to initiate the MP3 whenever audio plug 120 is inserted.

In one embodiment, the present invention further comprises automatically activating the electronic system in response to the indication of step 210. Thus, if handheld computer system 100 has been turned off or is in a "sleep mode", a user can automatically turn handheld computer system 100 on by inserting audio plug 120 into headphone jack 112. This facilitates extending the battery life of handheld computer system 100 and eliminates the extra step of having a user manually turn on the handheld computer system when initiating a software application.

In step 230 of FIG. 2A, the execution state of the software application is automatically changed. For example, in one embodiment a user inserting audio plug 120 into headphone jack 112 automatically triggers sending a notification to a designated application (e.g., an audio player application). The designated application is then automatically initiated in response to the notification. In one embodiment, the designated application is an audio application such as an MP3 audio application. Additionally, in one embodiment, inserting the audio plug into headphone jack 112 further causes handheld computer system 100 to be activated. Thus, the present invention facilitates initiating applications on a handheld computer system without the necessity manually turn on the handheld and navigate a plurality of menus to initiate an application.

Additionally, in one embodiment, the present invention further comprises configuring handheld computer system according to parameters of the designated software application. For example, a user can configure an MP3 application to stop playing a song at a particular point by removing audio plug from headphone jack 112. This will also terminate the application and optionally turn off handheld computer system 100. The user can later insert the plug into headphone jack 112 to activate system 110, automatically initiate the MP3 application, and resume playing the song at the point where it was previously stopped. In so doing, the present invention provides a fast and robust method for initiating an application on a handheld computer system.

In another implementation of the present invention, handheld computer system 100 can be used as a wireless telephone or voice mail device. When a user receives an indication of an incoming telephone call or voice message, they can insert audio plug 120 into headphone jack 112 to initiate a cellular telephone application and answer the phone. When the telephone session has completed, the user can remove audio plug 120 from headphone jack 112 to terminate the cellular telephone application.

In another implementation of the present invention, a user removing audio plug 120 from headphone jack 112 automatically triggers sending a notification to an application which is running on handheld computer system 100. The active application is then automatically terminated or suspended in response to the notification.

In another embodiment, the active application continues running in the background while the designated software application runs in the foreground. Furthermore, in one embodiment of the present invention, upon terminating the designated software application, handheld computer system 100 is automatically shut down. For example, in one embodiment a shut down routine for the designated application is automatically invoked in response to the notification sent in step 220. When the shut down routine for the designated application has completed, handheld computer system 100 is automatically shut down. This facilitates extending battery and simplifies operating handheld computer system 100 as, for example, an audio device.

Figure 2B:
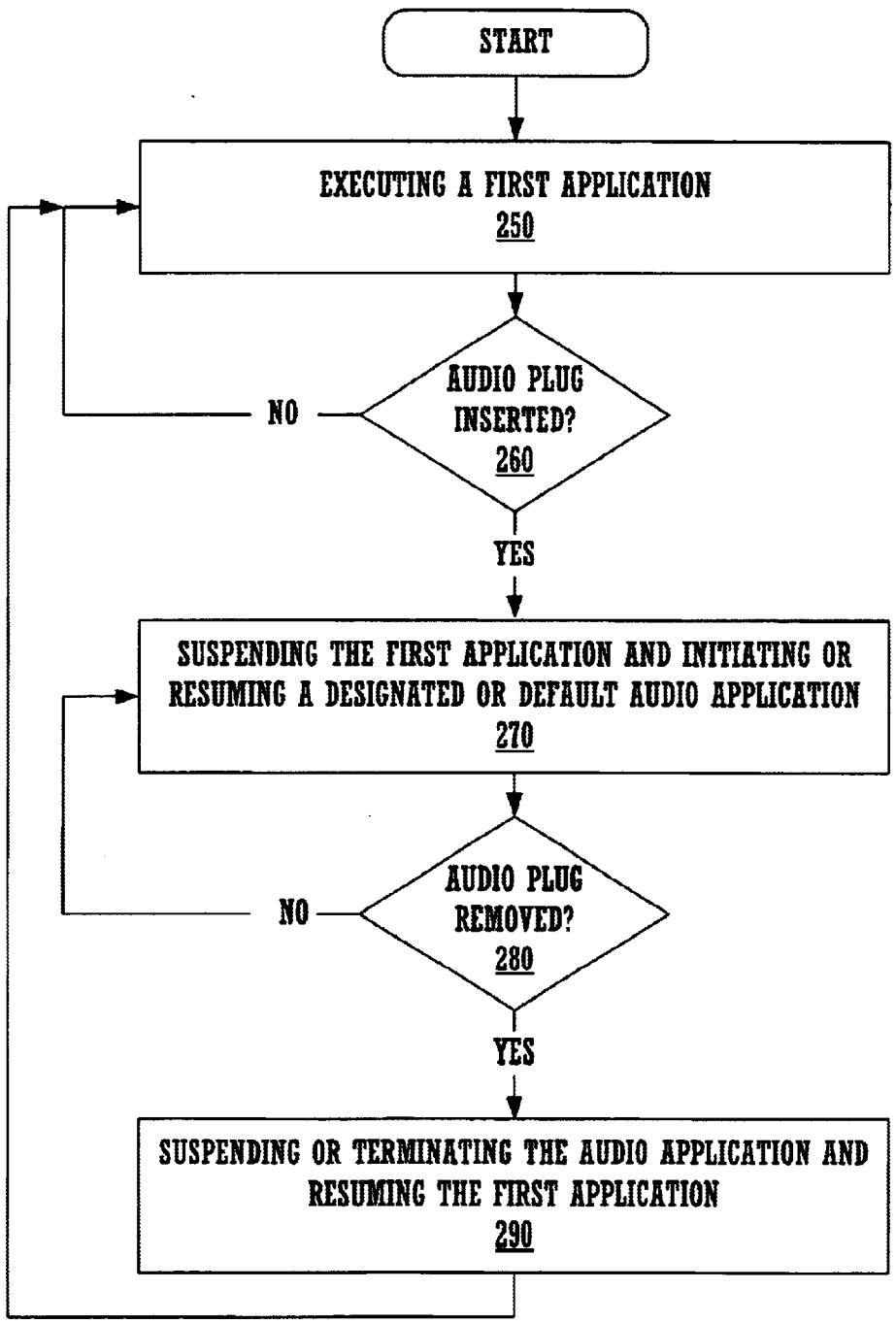

FIG. 2B is a flow chart 240 of a method for controlling an application on a handheld computer system in accordance with embodiments of the present invention. In step 250 of FIG. 2B, a first application is executed. For example, handheld computer system 100 is capable of executing a variety of applications such as an address book, calendar, games, etc.

In step 260 of Figure of 2B, a logic operation is performed to determine the insertion state of an audio plug. Referring to FIG. 1, a logic operation determines the insertion state of an audio plug 120 into headphones jack 112. As mentioned above this can comprise to a hardware interrupt, software polling, or other methods for determining the insertion state of headphones jack 112. In the embodiment of flow chart 240, if no audio plug is inserted into headphone jack 112, the first application of step 250 will continue executing. If an audio plug is inserted into headphone jack 112, flow chart 240 proceeds to step 250.

In step 270 of FIG. 2B, the first application is suspended and a second application is initiated or resumed. In one embodiment, the first application continues running in the background while the second application is running in the foreground. The second application may be a specially designated or default application. In one embodiment of the present invention, in response to an audio plug being inserted into headphone jack 112, an audio application is initiated or resumed. For example, it a user is executing an address book application on handheld computer system 100, inserting an audio plug into headphone jack 112 causes computer system 100 to suspend the address book application and initiate an audio application. As described above this can either be a default audio application or a user designated audio application (e.g., an audio player application, a wireless messaging application, a cellular telephone application, etc.). In another example, a user can resume an audio application previously suspended by inserting audio plug 120 into headphone jack 112.

In step 280 of FIG. 2B, a logic operation is performed to determine the insertion state of an audio plug. Referring again to FIG. 1, a logic operation determines the insertion state of an audio plug 120 into headphones jack 112. As described above this can comprise to a hardware interrupt, software polling, or other methods for determining the insertion state of headphones jack 112. In the embodiment of flow chart 240, if audio plug 120 is not removed from headphone jack 112, the second application of step 270 continues executing. If audio plug 120 is removed from headphone jack 112, flow chart 240 proceeds to step 290.

In step 290 of FIG. 2B, the second application is terminated or suspended and the first application is resumed. For example, when audio plug 120 is removed from headphone jack 112, the second application is terminated, and the address book application that was previously executing on handheld computer system 100 is resumed. Alternatively, the second application is suspended and the address book application is executed.

For example, a user of a handheld computer system is executing an address book application. Upon inserting an audio plug into the headphone jack, they automatically initiate an audio player application and can listen to music over headphones coupled to the audio plug. The user can suspend the execution of the audio player application by removing the audio plug from the headphone jack and the suspended address book application resumes. Upon reinserting the audio plug, the address book application is suspended and the audio player application is resumed at the point in the playlist where the application was suspended when the audio plug was removed. Alternatively, if the audio player application is properly configured, removing the audio plug from the headphone jack automatically terminates the audio player application and resumes execution of the first application. At this point, process 240 may be repeated.

Figure 3:
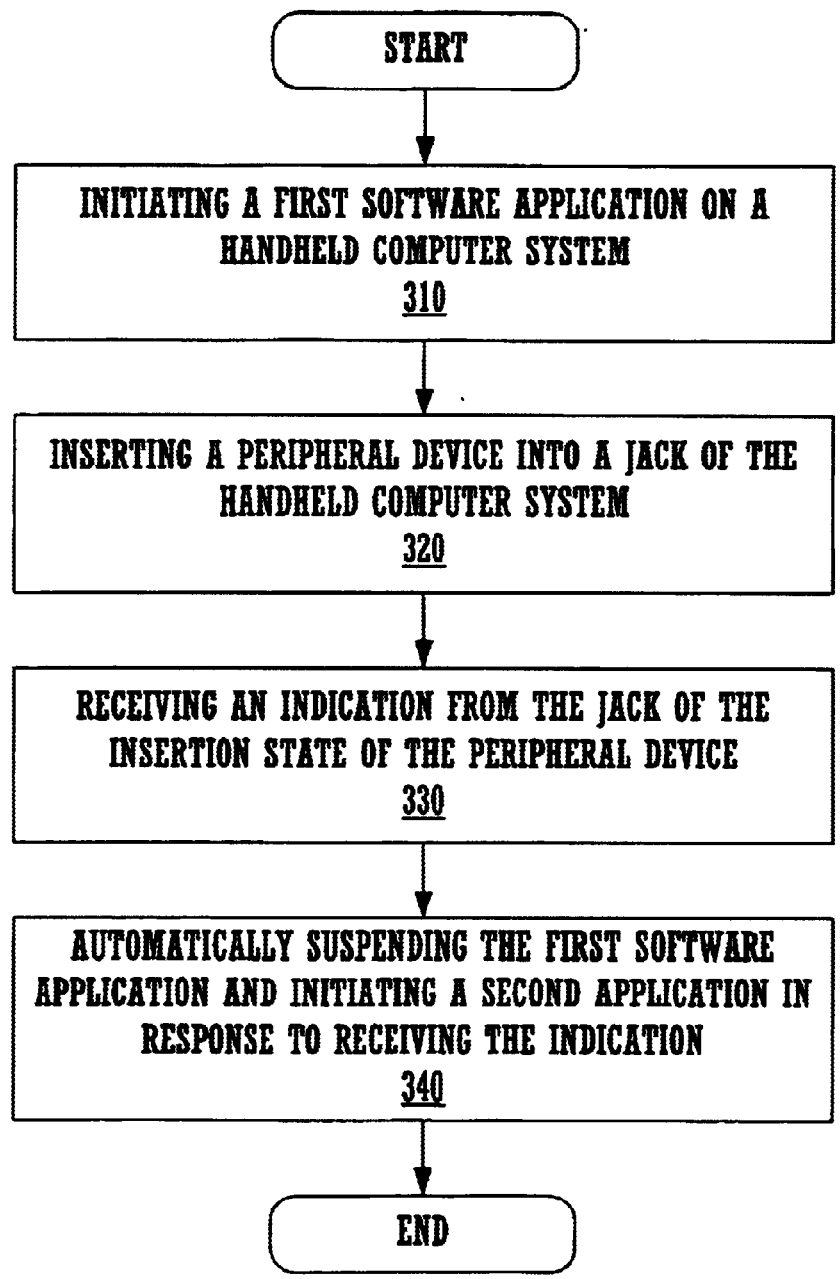
FIG. 3 is a flow chart of a method for selecting an application in accordance with embodiments of the present invention.

FIG. 3 is a flow chart of a computerized method for selecting an application on a handheld computer system in accordance with embodiments of the present invention. In step 310 of FIG. 3, a first software application is initiated on a handheld computer system (e.g., handheld computer system 100 of FIG. 1).

Referring to FIG. 1 and to step 320 of FIG. 3, a peripheral device plug is inserted into a jack of the handheld computer system. As described above, the peripheral device plug could be an audio plug from a variety of devices such as audio headphones, audio speakers, telephone headsets, etc.

In step 330 of FIG. 3, an indication is received from the jack of the insertion state of the audio plug. According to embodiments of the present invention, this can comprise a hardware interrupt, software polling, or other methods to indicate the insertion of the audio plug to processor 102.

In step 340 of FIG. 3, the first application is automatically suspended and a second application is automatically initiated in response to the indication. In response to the indication of the insertion of the audio plug, the first application is automatically suspended and a second application is initiated. In one embodiment, the first application continues running in the background while the second application runs in the foreground. In one embodiment, the second application is an audio player which is automatically initiated in response to the indication. In another embodiment of the present invention, a default audio application is automatically initiated if the user has not designated a particular audio application. However, the present invention is well suited for initiating a variety of applications in response to the indication such as games, wireless voice mail application, wireless telephone applications, etc. Additionally, in one embodiment, the state of the audio output of the handheld computer system is automatically changed in response to the indication.

This provides a robust, automatic method for selecting an audio application when another application is currently running on a handheld computer system. For example if a first application is running on a handheld computer system, a user can initiate a second application by inserting an audio plug into the jack. An indication is received from the jack of the insertion and the second application is automatically initiated and made the active software application in response to the indication. In one embodiment, the application is a designated audio application which is automatically initiated as a result of inserting the audio plug into a headphone jack. Furthermore, according to embodiments of the present invention, handheld computer system 100 is configured according to parameters of the second software application.

In one embodiment of the present invention, when a user removes the audio plug from the jack, an indication is received of the insertion state of the audio plug. In response to the indication, the second software application is automatically suspended and the first application is resumed.

The preferred embodiment of the present invention, a method for controlling software on a handheld computer system, is thus described. While the present invention has been described in particular embodiments, it should be appreciated that the present invention should not be construed as limited by such embodiments, but rather construed according to the following claims.

What is claimed is:

1. In a handheld computer system having a plurality of applications and a headphone jack, a method for controlling software comprising:
   receiving an indication from said headphone jack of an insertion state of an audio plug;
   in response to said indication, automatically suspending a first software application resident on said handheld computer system; and
   automatically initiating an audio player application resident on said handheld computer system.

2. The method for controlling software as recited in claim 1, further comprising automatically configuring said handheld computer system according to parameters of said audio player application.

3. The method for controlling software as recited in claim 1, wherein said insertion state indicates that said audio plug is being removed from said headphone jack and wherein said automatically suspending comprises:
   automatically suspending said audio player application.

4. The method for controlling software as recited in claim 1, further comprising automatically changing an audio output state of said handheld computer system in response to said indication.

5. The method for controlling software as recited in claim 1, wherein said receiving an indication comprises receiving a hardware interrupt from a circuit coupled to said headphone jack.

6. The method for controlling software as recited in claim 1, wherein said receiving an indication comprises software polling a circuit coupled to said headphone jack of said insertion state and receiving a response from said circuit coupled to said headphone jack.

7. The method for controlling software as recited in claim 1, wherein said receiving an indication comprises receiving said indication from a mechanical switch coupled with said headphone jack.

8. The method for controlling software as recited in claim 1, wherein said receiving an indication comprises receiving said indication from an electrical switch coupled with said headphone jack.

9. In a handheld computer system having a plurality of applications and a headphone jack, a method for initiating a software application comprising:

inserting an audio plug into said headphone jack;

receiving an indication from said headphone jack of an insertion state of said audio plug; and in response to said indication, automatically suspending an active software application running on said handheld computer system and initiating said software application resident on said handheld computer system, and wherein said software application is different than said active software application.

10. The method for initiating a software application as recited in claim 9, wherein said software application is an audio player application and comprising automatically initiating said audio player application in response to said indication.

11. The method for initiating a software application as recited in claim 10, further comprising configuring said handheld computer system according to parameters of a default audio software application.

12. The method for initiating a software application as recited in claim 9, wherein said receiving an indication comprises receiving a hardware interrupt from a circuit associated with said headphone jack.

13. The method for initiating a software application as recited in claim 9, wherein said receiving an indication comprises software polling a circuit coupled to said headphone jack of said insertion state and receiving a response from a circuit associated with said headphone jack.

14. The method for initiating a software application as recited in claim 9, wherein said receiving an indication comprises receiving said indication from a mechanical switch coupled with said headphone jack.

15. The method for initiating a software application as recited in claim 9, wherein said receiving an indication comprises receiving said indication from an electrical switch coupled with said headphone jack.

16. The method for initiating a software application as recited in claim 9, further comprising automatically activating said handheld computer system in response to said indication.

17. The method for initiating a software application as recited in claim 9, further comprising automatically changing an audio output state of said handheld computer system in response to said indication.

18. In a handheld computer system having a plurality of applications and a headphone jack, a method for suspending a software application comprising:

removing an audio plug from said headphone jack;

receiving an indication from said headphone jack of an insertion state of said audio plug; and in response to said indication, automatically suspending a software application running on said handheld computer system and activating a second software application resident upon said handheld computer system, and wherein said second software application is different than said active software application.

19. The method for suspending a software application as recited in claim 18, wherein suspending comprises automatically suspending an audio player application running on said handheld computer system.

20. The method for suspending a software application as recited in claim 18, wherein said receiving an indication comprises receiving a hardware interrupt from a circuit associated with said headphone jack.

21. The method for suspending a software application as recited in claim 18, wherein said receiving an indication comprises software polling a circuit associated with said headphone jack of said insertion state and receiving a response from said circuit coupled to said headphone jack.

22. The method for suspending a software application as recited in claim 18, wherein said receiving an indication comprises receiving said indication from a mechanical switch coupled with said headphone jack.

23. The method for suspending a software application as recited in claim 18, wherein said receiving an indication comprises receiving said indication from an electrical switch coupled with said headphone jack.

24. The method for suspending a software application as recited in claim 18, further comprising automatically terminating said software application.

25. The method for suspending a software application as recited in claim 18, further comprising automatically shutting off said handheld computer system in response to said receiving of said indication.

26. In a handheld computer system having a headphone jack, a method for selecting an application comprising:

initiating a first software application;

inserting an audio plug into said headphone jack;

receiving an indication from said headphone jack of an insertion state of said audio plug; and in response to said indication, automatically suspending said first software application and initiating an audio player application resident on said handheld computer system, and wherein said audio player application is different than said active software application.

27. The method for selecting an application as recited in claim 26, further comprising configuring said handheld computer system according to parameters of said audio player application.

28. The method for selecting an application as recited in claim 26, further comprising:

removing said audio plug from said headphone jack;

receiving an indication from said headphone jack of an insertion state of said audio plug; and in response to said indication, automatically suspending said audio player application and activating said first software application.

29. The method for selecting an application as recited in claim 26, further comprising automatically changing an audio output state of said handheld computer system.

* * * * *